Patented Aug. 16, 1927.

1,639,272

UNITED STATES PATENT OFFICE.

FORREST C. REED, OF EASTON, PENNSYLVANIA.

PROCESS FOR THE DIRECT SYNTHESIS OF AMMONIA.

Application filed January 21, 1926. Serial No. 82,823.

This invention relates to new improvements in processes for the direct synthesis of ammonia.

The present invention relates more particularly to the processes involving the direct synthesis of ammonia from its elements, nitrogen and hydrogen, by passing said elements mixed in the proper proportions over a suitable catalyst at elevated temperatures and pressures.

The object of the present invention is, then, to provide means for reducing the loss of nitrogen and hydrogen gas when purging off the inert gases and impurities, to reduce the size of apparatus and the power required for recirculation of gases, to provide means for purification of the ammonia product, to provide means for the temperature control of the process and for the protection of the converter walls, to provide improved heat interchange, to provide improved disposition of the catalyst body, and direction of flow of gases therethrough, and to obtain flexibility of operation. In order to obtain these and other advantages as may be brought out in the following description and drawings, I propose in the present invention to operate two or more converters in series in a cyclic process for the synthetic production of ammonia from its elements, and thereby make it possible, as will be shown later, to reach a higher concentration of inert gases in the recirculated gases, as compared to the average concentration in the converters, than can be attained in any other process; and to purge, without interrupting the process, a portion of said recirculated gases at a high concentration of inert gases such as argon, while using such purged gases for preheating the gases entering converters; and to separate the ammonia containing water produced in the first of said converters, thereby making possible the production of dry ammonia in the succeeding converters. Furthermore, I propose to operate two converters in series in a cyclic system in preference to one converter of twice the capacity or to two converters of the same capacity operating in parallel in a cyclic process.

The process as described in the present invention, will, hereinafter, be referred to as the series cyclic process.

The chemical formula for the formation of ammonia is $N_2 + 3H_2 \rightleftarrows 2NH_3$, or 4 volumes of $(N_2 + 3H_2)$ gas shrink to 2 volumes of $NH_3$ gas. Assuming in a cyclic process that a catalyst and operating pressure are such as to give a conversion of 20% in one passage of the aforesaid gases over the catalyst, i. e., through one converter, for every 100 volumes, which equals the volume of unconverted nitrogen and hydrogen gases leaving the converter and recirculated (80 volumes), plus the volume converted into ammonia gas and removed (20 volumes), 120 volumes of nitrogen and hydrogen gas must enter the converter. Now, excluding impurities, in order to convert the remaining 80 volumes of nitrogen and hydrogen gas into ammonia, the unconverted gases must be recirculated 80/40=2 times. The ratio of concentration of inert gases, such as argon, in the circulatory system to the concentration at the entrance of the converter is approximately 120/80=1.5. In order to convert 40 volumes with the same conversion factor as in the above example all the volumes as given above would be doubled, 240 volumes would enter the converter, 160 volumes would be recirculated i. e. it would require two converters each with 120 volumes entering or one converter of twice the capacity with 240 volumes entering but the ratios of recirculations and concentration would remain the same. Now, if two converters were operated as in the series cyclic process to produce the same amount of ammonia (40 volumes) as above and with the same average factor of conversion (20%) in each converter (total conversion 40%) for every 100 volumes which equals the volume leaving the second converter and recirculating (60 volumes) plus the total volume converted and removed after both converters (40 volumes), 140 volumes must enter the first converter and, again excluding impurities, the unconverted gases must be recirculated approximately 60/80=.75 times. The ratio of concentration of inert gases in the circulatory system to the concentration at the entrance of the first converter is approximately 140/60=2.33. Therefore, when operating two converters in a series cyclic process with the same average factor of conversion in each converter as used in the cyclic process producing the same amount of ammonia, the amount of gas recirculated is approximately .75/2=.375 of the amount of gas recirculated when using one converter.

of twice the capacity or two converters of the same capacity in parallel in a cyclic process, and the concentration of inert gases in the circulatory system of the series cyclic process is approximately 2.33/1.5=1.56 times that of the cylic process. The above comparison could also be made by considering equal average space velocities in the converters of both processes. It is, however, difficult to select an actual case for comparison where both the average space velocities and average factors of conversion are exactly equal. Now, assuming the same concentration of inert gases entering the converter of a cyclic process, as that entering the first converter of the series cyclic process of the same capacity and both processes producing the same amount of ammonia, since the total volume of gas recirculating in a unit of time in the series cyclic process is always less than that of the cyclic process, while the amount of inert gases recirculated in either process is the same, it follows that the increase in the concentration of the inert gases from the entrance of the converters to circulatory system must always be greater in the series cyclic process of the present invention than that of the cyclic process. The determining factor in the maximum permissible concentration of inert gas is the converter and not the circulatory system, and any comparison between the series cyclic and cyclic process must be on the basis of concentration permissible in the converter. Furthermore, this increase of the concentration from the entrance to the circulatory system of the converter of the series cyclic process of the present invention increases over that of the cyclic system with increasing factors of conversion.

Recent developments in the processes for the synthetic production of ammonia have demonstrated the importance and necessity of some economical system of purging the aforesaid inert gases from the system with a minimum loss of nitrogen and hydrogen gas consistent with the value of the ammonia produced and the value of the nitrogen and hydrogen gas lost with the purged gases.

It should be particularly noted here that since the purging is done in the circulatory system of a cyclic process after the ammonia has been condensed and removed that the loss of nitrogen and hydrogen gas due to purging decreases in proportion to the concentration of the inert gases and therefore since the concentration maintained in the circulatory system is greater in proportion to the average concentration in the converters of the series cyclic process as described in the present invention than that in any other process, the loss due to purging is reduced in the same proportion.

Furthermore, by the same method of calculations as above outlined and correcting the conversion factors according to the effect of the partial pressures of the inert gases, it can be shown that, given two converters in a series cyclic process and a single converter of twice the capacity or two converters of the same capacity in parallel in a cyclic process with both processes producing the same amount of ammonia and with the cyclic process circulating approximately 100% more gas, the cyclic process must use approximately 100% more power for circulation and must have approximately 50% less concentration of inert gases in the circulating system, and, therefore, approximately 100% greater loss of nitrogen and hydrogen gas in purging than in the series cyclical process of the present invention. And, furthermore, the oxygen in the system will be removed as water with the ammonia condensed out after the first converter of a series cyclical process as described in the present invention and thereby purifying the gas going to the succeeding converter.

It should be noted in comparing the series cyclical process with two converters of the same size operating in parallel in a cyclical process, that the preliminary converter, or other means of purification necessary for purification in the latter process is eliminated in the former process of the present invention. It should be further noted in comparing the above processes that since a smaller volume of gas is recirculated in the series cyclic process, a smaller size of pipes and fittings can be used and still maintain the same drop in pressure through the system.

The reduction in capacity or in the number of circulating pumps made possible by the process of the present invention is economically very important. A reduction in capacity in proportion to the example given above would mean a corresponding decrease in the dimensions of the circulating pump which is of exceeding importance in designing for the high pressures now in use; while reducing the number of circulating pumps in a process is even of greater importance because of the operating difficulties, as is well known to those skilled in the art, due to the inability to use lubricating oil in the cylinders and on the piston rods on account of the effect of the lubricating oil on the life of the catalyst as well as the possible contamination of the ammonia product.

Further advantages of the process of the present invention are first the flexibility of operation by changing the number of converters operating or by by-passing a converter while recharging with catalyst or for repairs without interrupting the continuous operation of the process; and second, the better control of temperatures due to a better distribution of the heat generated.

Referring to the drawings in which like characters of reference indicate similar parts throughout:

Figure 1:
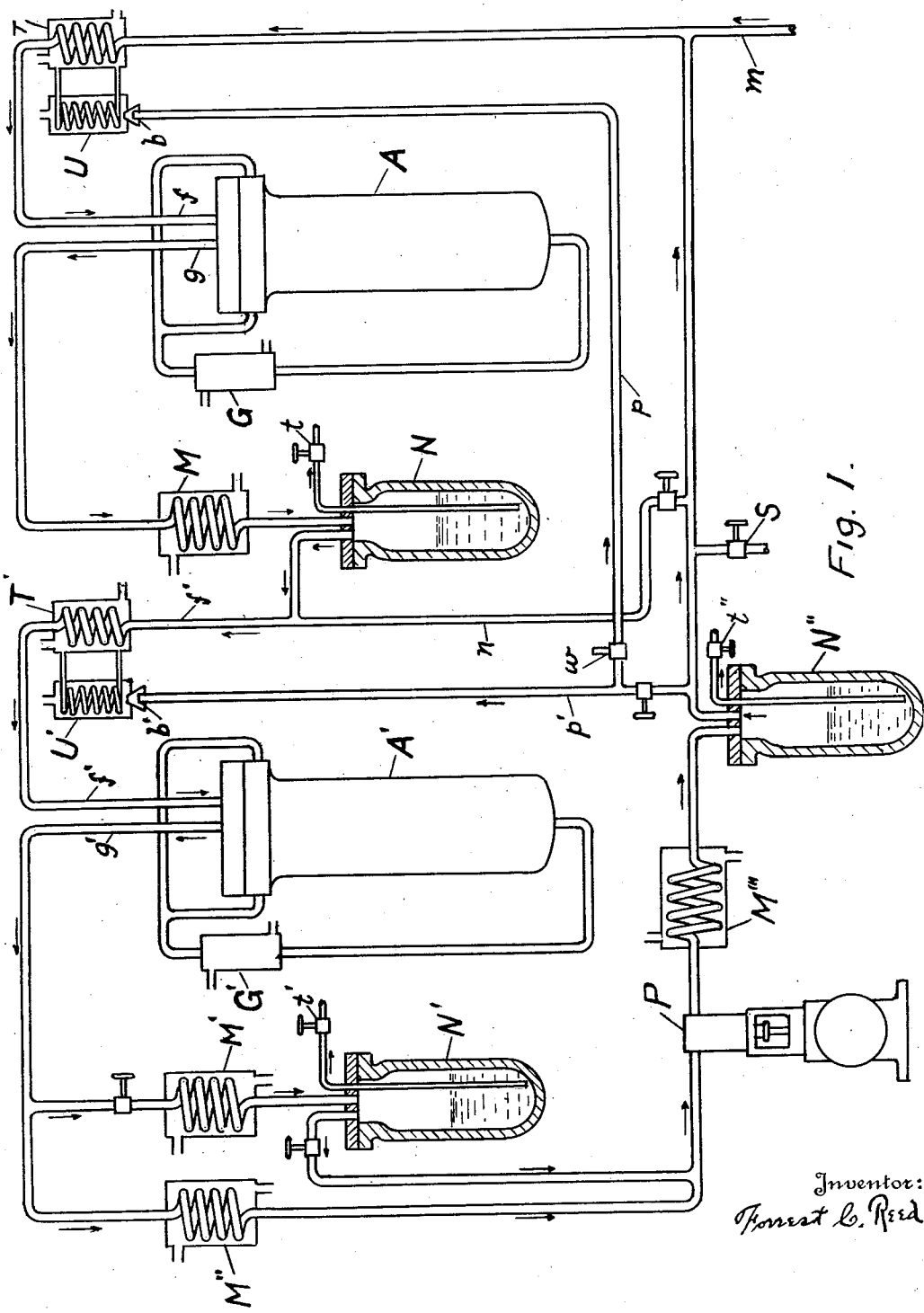
Fig. 1 is an elevation showing an apparatus adaptable for carrying out the process of the present invention.

Referring to Fig. 1, A and A' are converters arranged for operating in series in a cyclic system. G and G' are condensers for the thermosiphon cooling of converter shell. M, M', M'', and M''' are condensers, N, N' and N'' are liquid receivers, P is a circulating pump, T and T' are preheaters of suitable design utilizing the purged gases for heating; in the construction here shown, the heat of the burning gas is applied to the coils, U and U' containing the heating medium surrounding the coils, T and T'.

Figure 2:
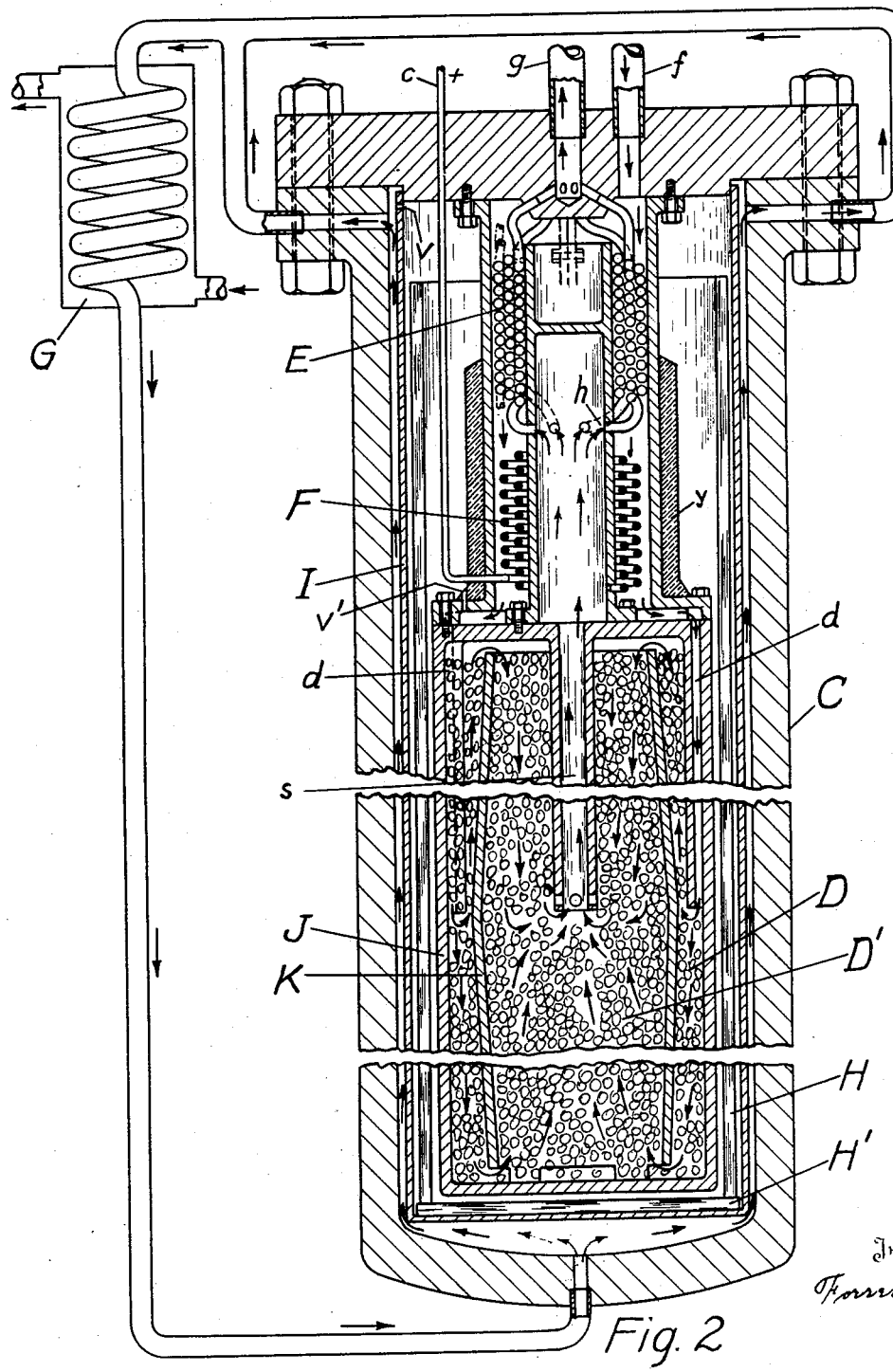
Fig. 2 is a cross sectional elevation of one of the converters A and A' in Fig. 1.

Referring to Fig. 2, C is a pressure sustaining vessel. D and D' are the catalytic materials; J is the outer wall of the catalyst chamber in which the wall K divides the catalytic mass into an inner and an outer body. The wall K might be either straight or preferably tapering conically in each direction from the center to the smaller ends, as shown, or it might taper conically in one direction only, i. e., it could be formed like either the upper or lower half of K without departing from the spirit or scope of the present invention. The object in dividing the catalytic mass into an inner and an outer body, being to make it possible to proportion the volumes of the two bodies of catalyst in such a manner that the flow of gas is from the outer to the inner body of catalyst, and so that the heat generated in the outer catalyst body in excess of the heat absorbed by the incoming gas and that radiated and conducted outwardly and carried inwardly, is less than the total heat generated in, radiated to, and conducted to the inner catalyst body, so that the average operating temperature of the outer catalyst body is less than the average operating temperature of the inner catalyst body; this temperature difference being preferably from 50° to 150° C.; the two catalyst bodies having preferably different percentages of promoters to give the best efficiencies at their different respective temperatures of operation; the purpose being to maintain the lower temperature next to the wall of the pressure sustaining vessel for reasons of strength and in contradiction to forming the catalytic body so as to maintain a uniform temperature throughout. E is a heat exchanger of suitable design, here shown as consisting of a plurality of spirally-wound tubes, two tubes being wound together similar to a double threaded screw thread, thus adding to the length and subtracting from the width of the heat exchanger and giving a higher velocity of the gases over the outside of the tubes than is possible with a single winding. A plurality of passages $d$, communicatively connect the space surrounding electric heater F, with the central portion of the outer catalyst body D, $c$ is an electric lead to heater F, and $y$ is an insulating material. G is a condenser of suitable design, communicatively connected to top and bottom of pressure-sustaining vessel C.

H and H' are insulating materials and preferably with reflecting qualities; I is a cylindrical shell closed at the bottom and forming a dead space between itself and the wall of the pressure-sustaining vessel C. The pressure within the apparatus is equalized by means of the small holes V and V' through which the thermo-siphon is placed in communication with the incoming gases, a portion of the gas being by-passed through such holes to the thermo-siphon system. The only pressure difference within the pressure-sustaining vessel C is that which is required to force the gas through the catalyst and heat interchanger.

The process described in the present invention may be carried out in the following manner: Nitrogen and hydrogen gas mixed in the proper proportions are supplied at $m$ in Figure 1, the flow through the system being in the direction indicated by arrows. The flow through the converters A and A' can be seen by referring to Fig. 2. The catalyst chamber J is filled with suitable catalyst D and D'; electric current is supplied to heater F and a small amount of nitrogen and hydrogen gas of the proper mixture is admitted at $f$ and passed through the converter and out at $g$ while the temperature of the catalyst is brought up high enough to promote reaction. The pressure on the apparatus is then gradually increased to the operating pressure. The gas entering at $f$ is conducted downwardly over the outside of the heat interchanger tubes E, over the electric heater F, and from thence through passages $d$ to the central part of outer catalyst body D; the gas now divides, part of which travels upward and part downward through outer catalyst D in the direction of the arrows at the ends of the inner catalyst chamber wall K, where the direction of flow is reversed and the flow is toward the central part of inner catalyst body D', from whence it is conducted upwardly through tube $s$ into the inside of heat interchanger tubes at $h$ and from thence out at $g$. The division of gases as described above distributes the heat generated in an axial direction. The incoming gases are thus heated by the outgoing gases.

If the pressure at which reaction takes place is high enough, and the heat interchanger E is properly designed, the process becomes autothermal, in which case the electric heater F is then only necessary for starting. The wall of the pressure-sustaining vessel C is maintained at a temperature compatible with safety by the condenser G, which by cooling the gas causes a thermo-siphon action or circulation of the gas between the cylindrical shell I and the pressure sustaining wall C. This thermosiphon action protects said walls not only by the conduction of heat therefrom, but also by diminishing the transfer of heat to said wall by conduction and by convection through the thin layer of gas between cylindrical shell I and pressure-sustaining wall C. The reflecting insulation H also reduces the transfer of heat to the outside wall. The thermosiphon action can be increased by placing the condenser above the top of converters. The limiting height would be reached when the additional head of gas column thus obtained would be equal to the loss of head, due to friction in the additional length of pipe.

Referring again to Figure 1, the mixture of nitrogen and hydrogen gas has passed through converter A as above described and the mixture of nitrogen and hydrogen gas, together with the gases converted into ammonia gas are conducted through the pipe $g$ to condenser M where the gases are cooled and the ammonia gas liquefied and collected in the receiver N. The liquid ammonia is removed from receiver N through pipe $t$, extending below the surface of the liquid, so that the operating pressure forces the ammonia out. The unconverted gases are then conducted through pipe $f'$ and through preheater T' to second converter A', where the procedure through the converter is the same as described in converter A.

The outgoing gases leaving converter A' through pipe $g'$ are either all cooled in condenser M'' and the ammonia gas liquefied and removed in receiver N'' after passing through circulating pump $p$, or a part of said gases may be passed through condenser M'' as before and the remainder passed through condenser M', where the gases are cooled and the ammonia liquefied and removed in the receiver N'. In either case, further cooling can be carried out at condenser M''' between the circulating pump P and receiver N'', if desired. The object being to liquefy enough ammonia before circulating pump P to act as a lubricant. It should be here noted that while I have above described the liquefaction and removal of ammonia by cooling in the condensers M, M' M'' and M''', yet the removal of ammonia could as well be accomplished by any suitable absorption process. After leaving the receiver N'', the unconverted gases are then returned through the preheater T to the intake of first converter A, the circulating pump P making up the loss in pressure through the whole apparatus and nitrogen and hydrogen gas being continuously supplied at the operating pressure through pipe $m$ to make up for the gas converted into ammonia. A small amount of circulating gas can, if desired be by-passed through pipe $n$ to inlet of second converter A', which will tend to equalize the conversion in both converters. The cycle is repeated as many times as is necessary for the complete conversion of all the nitrogen and hydrogen mixture into ammonia.

Inert gases such as argon are allowed to accumulate in the circulatory system until the concentration reaches an amount consistent with economical operation and the system is then purged preferably continuously to keep the concentration at the desired amount without disturbing or interrupting the process. The gases are purged at S either to the atmosphere or they can be utilized for their heat value, or otherwise disposed of. We propose in the present invention to supply heat for the preheaters T and T', the gas being supplied through pipes $p$ and $p'$, to the burners $b$ and $b'$, the pressure being maintained at any desired value by the relief valve $w$.

It should be here especially noted that if a process for the synthetic production of ammonia is autothermal and no electrical heat is added, other means must be provided for the control of temperatures within the converters. The practice has been to so proportion the heat intercharger that some electrical heat is added for regulating purposes. We propose in the present invention to utilize the preheaters T and T' and the condensers G and G', as means for controlling the temperature within the converters A and A'.

If converters A and A' are of the same capacity, the tendency would be for converter A to produce a slightly greater amount of ammonia than converter A', because of the greater volume of gas passing through A and while this is of no particular disadvantage, it can be equalized, as pointed out above, by by-passing from the circulatory system through pipe $n$ to converter A', or by using a slightly less volume of catalyst in converter A. The tendency for greater production in converter A is partially offset by the fact that the conversion per unit volume of gas is reduced by the increased ratio of the volume of the gas passing to the volume of catalyst and by the presence of water in the first converter which is used as a means of purification.

Claude (U. S. Patent 1,332,460) has confined his process to pressures above 400 atmospheres and temperatures above 500° where the conversion factors are comparatively high, and as I have pointed out, his process would not be practicable for the lower pressures, for example 400 atmospheres and under, because of the large number of converters required for even approximately complete conversion, and furthermore increased concentrations of inert gases, such as argon have a much greater influence on the conversions at the higher pressures of operation; and while, as pointed out above, the advantages of the series cyclic system of the present invention are greater for the lower operating pressures and temperatures and consequently lower conversions, for example, pressures of 400 atmospheres and under, and temperatures of 500° C. and under, yet I do not wish to be understood as limiting my process as to pressures and temperature.

Obviously there are other methods of carrying out the present invention without departing from the spirit and scope of the present invention, and so I do not wish to be understood as limiting myself, except as required by the following claims when construed in the light of the prior art.

What I claim is:

1. The process of producing ammonia by passing at a high temperature (500° C. and under) a gaseous mixture containing nitrogen and hydrogen over suitable catalytic agents arranged in series and removing at a lower temperature ammonia contained in the gases leaving each catalyst and then again passing the gases leaving the last catalyst of the series from which ammonia has been removed over the series of catalysts in like manner while carrying out the process continuously under substantially constant pressure (400 atmospheres and under) and replacing the quantity of ammonia removed from the gases during each passage over the series by a fresh quantity of nitrogen and hydrogen.

2. The process of producing ammonia by passing at a high temperature (500° C. or under) a gaseous mixture containing nitrogen and hydrogen over suitable catalytic agents arranged in series and removing at a lower temperature ammonia contained in the gases leaving each catalyst and then again passing the gases leaving the last catalyst of the series, from which ammonia has been removed, over the series of catalysts in like manner while carrying out the process continuously under substantially constant pressure (400 atmospheres or under) and replacing the quantity of ammonia removed from the gases during each passage over the series by a fresh quantity of nitrogen and hydrogen, and purging continuously from a point in the circulatory system after the ammonia has been removed and before the point at which fresh nitrogen and hydrogen are supplied.

3. The process of producing ammonia by passing at a high temperature (500° C. or under) a gaseous mixture containing nitrogen and hydrogen over suitable catalytic agents arranged in series, and removing at a lower temperature ammonia contained in the gases leaving each catalyst, and then again passing the gases leaving the last catalyst of the series, from which ammonia has been removed, over the series of catalysts in like manner, and utilizing a portion of said gases purged continuously from a point in the circulatory system after the ammonia has been removed and before the point at which fresh nitrogen and hydrogen are supplied to preheat the gases before entering the converter, and replacing the quantity of ammonia removed from the gases during each passage over the series by a fresh quantity of nitrogen and hydrogen.

4. The process of producing ammonia by passing at a high temperature (500° C. and under) a gaseous mixture containing nitrogen and hydrogen over suitable catalytic agents arranged in series and removing at a lower temperature ammonia contained in the gases leaving each catalyst, and then again passing the gases leaving the last catalyst of the series over the series of catalysts in like manner while carrying out the process continuously under pressure (400 atmospheres and under) and replacing the quantity of ammonia removed from the gases during each passage by a fresh quantity of nitrogen and hydrogen, and by passing a portion of the recirculated gases to the second catalyst whereby conversion in the two catalysts is equalized and the relative temperatures controlled.

5. The process of producing ammonia by the synthesis of its elements, in the presence of a catalyst, which comprises passing a mixture of nitrogen and hydrogen gas over a suitable catalytic body at an elevated pressure and temperature, said catalytic body being so formed and divided into an inner and an outer body causing the gas to flow from the outer body to the inner body and proportioning the volumes of the two bodies of catalyst in such a manner that the heat generated in the outer body of catalyst, in excess of the heat absorbed by the incoming gases and that radiated and conducted outwardly and carried inwardly is less than the total heat generated in, radiated to and conducted to the inner body of catalyst, so that the average operating temperaure of the outer body of catalyst is less than the average operating temperature of the inner body of catalyst, this temperature difference being preferably within the range of from 50 to 150° C.

6. The process of producing ammonia by the synthesis of its elements, in the presence of a catalyst, which comprises passing nitrogen and hydrogen gas, mixed in suitable proportions, over a suitable catalyst at an elevated temperature and pressure, said catalytic body being so formed and divided into an inner and an outer body as to cause the gases to flow from the outer body to the inner body of catalyst.

7. The process of producing ammonia by the synthesis of its elements, in the presence of a catalyst, which comprises passing nitrogen and hydrogen gas, mixed in suitable proportions, over a suitable catalyst at an elevated temperature and pressure, while causing all of said gases to flow from the outer portion of said catalytic body to the central portion of said catalytic body.

8. The process of producing ammonia by the synthesis of its elements, in the presence of a catalyst, which comprises passing nitrogen and hydrogen gas, mixed in suitable proportions, over a suitable catalyst at an elevated temperature and pressure, said catalytic body being so formed and divided into an inner and an outer body as to cause the gases to flow from the outer body to the inner body of catalyst, and while causing the cooler gases entering the catalyst body to be heated through indirect heat exchange by the hotter gases of reaction leaving said catalyst body.

9. The process of producing ammonia by the synthesis of its elements in the presence of a catalyst, which comprises passing nitrogen and hydrogen gas, mixed in suitable proportions, over a suitable catalyst at an elevated temperature and pressure, while causing all of said gases to flow from the outer portion of said catalytic body to the central portion of said catalytic body, and while causing the cooler gases entering the catalyst body to be heated through indirect heat exchange by the hotter gases of reaction leaving said catalyst body.

10. The process of producing ammonia by the synthesis of its elements, in the presence of a catalyst, which comprises passing a mixture of nitrogen and hydrogen gas over a suitable catalytic body at an elevated pressure and temperature, said catalytic body being so formed and divided into an inner and an outer body causing the gas to flow from the outer body to the inner body and proportioning the volumes of the two bodies of catalyst in such a manner that the heat generated in the outer body of catalyst, in excess of the heat absorbed by the incoming gas and that radiated and conducted outwardly and carried inwardly, is less than the total heat generated in, radiated to, and conducted to the inner body of catalyst, so that the average operating temperature of the outer body of catalyst is less than the average operating temperature of the inner body of catalyst, this temperature difference being preferably within the range of from 50 to 150° C., and causing said gases to flow from the outer body of catalyst to the inner body of catalyst in one or more directions in such a manner that the heat generated is equalized in the axial direction of the catalyst bodies.

11. The process of producing ammonia by the synthesis of its elements in the presence of a catalyst, which comprises passing a mixture of nitrogen and hydrogen gas over a suitable catalytic body at an elevated pressure and temperature, said catalytic body being so formed and divided into an inner and an outer body causing the gas to flow from the outer body to the inner body and proportioning the volumes of the two bodies of catalyst in such a manner that the heat generated in the outer body of catalyst, in excess of the heat absorbed by the incoming gases and that radiated and conducted outwardly and carried inwardly, is less than the total heat generated in, radiated to, and conducted to the inner body of catalyst, so that the average operating temperature of the outer body of catalyst is less than the average operating temperature of the inner body of catalyst, this temperature difference being preferably within the range of from 50 to 150° C., the two bodies of catalyst having different percentages of promoters to give the best efficiencies and the longest life of the catalyst at their different respective temperatures of operation.

12. The process of producing ammonia by the synthesis of its elements in the presence of a catalyst, which comprises passing a mixture of nitrogen and hydrogen gas over a suitable catalyst at an elevated temperature and pressure while controlling the temperature of the walls of the pressure-sustaining vessel by contact therewith of a part of the gaseous mixture while causing said gaseous mixture to circulate thermosiphonally by conducting a portion of the incoming gases from a point near the top of the said pressure-sustaining vessel and through a suitable cooling means and then returning said gases to a point near the bottom of said pressure-sustaining vessel, the circulation being maintained by the difference in weight of the gas column and the gas column within the pressure-sustaining vessel and without the pressure-sustaining vessel.

13. The process of producing ammonia by the synthesis of its elements in the presence of a catalyst, which comprises passing a mixture of nitrogen and hydrogen gas over a suitable catalyst at an elevated temperature and pressure, while controlling the temperature of the pressure-sustaining walls and thereby the temperature of reaction by causing thermosiphon circulation of a part of the incoming gases between the catalyst body and the walls of said pressure-sustaining vessel by conducting said gases from a point near the top of said pressure-sustaining vessel and through a suitable cooling means and then returning said gases to a point near the bottom of said pressure-sustaining vessel, the circulation being maintained by the difference in weight of the gas column without and the gase column within the pressure-sustaining vessel, and while causing the cooler gas entering the catalyst body to be heated through indirect heat exchange by the hotter gases of reaction leaving said catalyst body.

14. The process of producing ammonia by the synthesis of its elements, in the presence of a catalyst, which comprises passing a mixture of nitrogen and hydrogen gas over a suitable catalyst at an elevated temperature and pressure, while controlling the temperature of the pressure-sustaining walls and the temperature of reaction by causing thermosiphon circulation of a part of the incoming gases for substantially the entire length of pressure-sustaining apparatus between said pressure-sustaining wall and a cylindrical shell concentrically located between the catalyst chamber and pressure sustaining wall of said apparatus, said thermosiphon circulation being caused by conducting said gases from a point near the top of said pressure-sustaining vessel and through a suitable cooling means and then returning said gases to a point near the bottom of said pressure-sustaining vessel, the circulation being maintained by the difference in weight of the gas column without and the gas column within the pressure-sustaining vessel, and while causing the cooler gas entering the catalyst body to be heated through indirect heat exchange by the hotter gases of reaction leaving said catalyst body.

15. The process of producing ammonia by the synthesis of its elements, in the presence of a catalyst, which comprises passing a mixture of nitrogen and hydrogen gas over a suitable catalyst at an elevated temperature and pressure, while controlling the temperature of the pressure-sustaining walls and the temperature of reaction by causing thermosiphon circulation of a part of the incoming gases for substantially the entire length of pressure-sustaining apparatus between said pressure-sustaining wall and a cylindrical shell concentrically located between the catalyst chamber and pressure sustaining wall of said apparatus, said thermosiphon circulation being caused by conducting said gases from a point near the top of said pressure-sustaining vessel and through a suitable cooling means and then returning said gases to a point near the bottom of said pressure-sustaining vessel, the circulation being maintained by the difference in weight of the gas column without and the gas column within the pressure-sustaining vessel, and while causing the cooler gas entering the catalyst body to be heated through indirect heat exchange by the hotter gases of reaction leaving said catalyst body, and while bringing the incoming gas up to reaction temperature by passing said gases over an electric heater located axially between said heat interchanger and said catalytic body.

16. The process of producing ammonia by the synthesis of its elements in the presence of a catalyst, which comprises passing a mixture of nitrogen and hydrogen over a catalyst at an elevated temperature and pressure while controlling the temperature of the walls of the pressure sustaining vessel by by-passing a part of the incoming gases and causing the same to circulate thermosiphonally through cooling means and along the walls of such vessel.

17. The process of producing ammonia by the synthesis of its elements in the presence of a catalyst, which comprises passing a mixture of nitrogen and hydrogen gases through a catalyst at elevated temperatures and pressures, heating the cooler entering gases through heat exchanged between said gases and the hotter gasses of reaction leaving the catalyst, then removing the ammonia together with the water formed in said catalyst from the gases leaving said catalyst, thereby removing the oxygen from said gases, then passing the remaining unconverted gases through a second catalyst in a similar manner to passing through the first catalyst, removing the dry ammonia so formed, and again passing the remaining unconverted gases to the first catalyst while replacing the gases, formed and removed as ammonia, with fresh nitrogen and hydrogen gas supplied at the operating pressure to the first body of catalyst and while carrying out the process continuously at substantially a constant pressure and starting the reaction by electric means.

FORREST C. REED.